United States Patent
Lee

(10) Patent No.: US 9,784,168 B2
(45) Date of Patent: Oct. 10, 2017

(54) APPARATUS FOR COMPENSATING FOR THERMAL EXPANSION OCCURRING FROM EXHAUST MANIFOLD

(71) Applicant: Hyundai Motor Company, Seoul (KR)

(72) Inventor: Woo Jin Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/740,977

(22) Filed: Jun. 16, 2015

(65) Prior Publication Data

US 2016/0153340 A1    Jun. 2, 2016

(30) Foreign Application Priority Data

Dec. 1, 2014   (KR) .................. 10-2014-0170001

(51) Int. Cl.
*F01N 13/10* (2010.01)
*F03G 7/06* (2006.01)

(52) U.S. Cl.
CPC ............. *F01N 13/10* (2013.01); *F03G 7/065* (2013.01); *F01N 2260/10* (2013.01)

(58) Field of Classification Search
CPC ....... F01N 13/10; F01N 2260/10; F03G 7/065
See application file for complete search history.

(56) References Cited

U.S. PATENT DOCUMENTS

| | | | |
|---|---|---|---|
| 2003/0061807 A1* | 4/2003 | Kim .................. | F01N 3/28 60/323 |
| 2003/0073939 A1* | 4/2003 | Taylor ............... | A61H 1/0288 601/40 |
| 2006/0131817 A1* | 6/2006 | Kerelchuk .......... | F16J 15/0825 277/592 |

FOREIGN PATENT DOCUMENTS

| | | |
|---|---|---|
| JP | 2005-2885 A | 1/2005 |
| JP | 2009-36074 A | 2/2009 |
| KR | 10-2005-0047265 A | 5/2005 |
| KR | 10-2007-0036482 A | 4/2007 |
| KR | 10-2008-0008804 A | 1/2008 |
| KR | 10-2012-0066123 A | 6/2012 |

* cited by examiner

*Primary Examiner* — Mark Laurenzi
*Assistant Examiner* — Brandon Lee
(74) *Attorney, Agent, or Firm* — Morgan, Lewis & Bockius LLP

(57) ABSTRACT

An apparatus for compensating for thermal expansion occurring from an exhaust manifold in an engine may include an anti-thermal deformation member provided between the exhaust manifold and a turbo charger and connecting the exhaust manifold and the turbo charger together and configured to be deformed when the exhaust manifold thermally expands due to hot exhaust gas, compensating for thermal deformation caused by the thermal expansion.

1 Claim, 2 Drawing Sheets

APPARATUS FOR COMPENSATING FOR THERMAL EXPANSION OCCURRING FROM EXHAUST MANIFOLD

CROSS REFERENCE TO RELATED APPLICATION

The present application claims priority to Korean Patent Application No. 10-2014-0170001, filed Dec. 1, 2014, the entire contents of which is incorporated herein for all purposes by this reference.

BACKGROUND OF THE INVENTION

Field of the Invention

The present invention relates, in general, to an apparatus for compensating for thermal expansion occurring due to high temperature exhaust gas from an exhaust manifold to which a turbo charger is coupled.

Description of Related Art

Exhaust manifolds serve to guide exhaust gas from the inside towards the outside of an engine, and the exhaust gas guided outside of the engine is introduced into a turbo charger for recycling, or is otherwise discharged outside of a vehicle via an exhaust system.

In the former case, the turbo charger serves to compress and supply intake air using the introduced exhaust gas in order to promote an improvement in the output and acceleration performance of an engine and fuel efficiency.

According to the related art, a turbo charger is bolt-connected to an exhaust manifold. In this case, there is no consideration of thermal expansion of the exhaust manifold due to continuous exposure to high temperatures during traveling of a vehicle. Thus, when the exhaust manifold or the turbo charger is subjected to thermal expansion due to hot exhaust gas, a portion connected to the turbo charger suffers from thermal damage.

Particularly, as shown in FIG. 1, as the exhaust manifold 10 thermally expands, the turbo charger 30 coupled to the exhaust manifold 10 is thermally damaged, causing fastening bolts B between the exhaust manifold 10 and the turbo charger 30 to be damaged or unfastened.

To solve this problem, large bolts or spacers are to be used in order to increase torque. However, stronger bolting may damage the bolted portion or neighboring parts.

Thus, there is a need to compensate for thermal expansion of the exhaust manifold occurring from hot exhaust gas.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for compensating for thermal expansion occurring due to hot exhaust gas from an exhaust manifold, thereby preventing breakage or deformation of other parts connected to the exhaust manifold.

According to various aspects of the present invention, an apparatus for compensating for thermal expansion occurring from an exhaust manifold in an engine may include an anti-thermal deformation member provided between an exhaust manifold and a turbo charger and connecting the exhaust manifold and the turbo charger together and configured to be deformed when the exhaust manifold thermally expands due to hot exhaust gas, compensating for thermal deformation caused by the thermal expansion.

The anti-thermal deformation member may be deformed in a contracted manner at an opposite end to an end compressed, due to the thermal expansion of the exhaust manifold when the anti-thermal deformation member may be fed with an intense heat source from the exhaust manifold.

The anti-thermal deformation member may be formed of a shape-memory alloy at a specified end thereof with a shape which may be memorized within a predetermined temperature range.

The exhaust manifold may include a plurality of runners into which exhaust gas may be introduced from a combustion chamber of the engine, and an outlet through which introduced exhaust gas may be discharged towards the turbo charger, wherein the outlet extends downwards from a longitudinal end and may be connected to the turbo charger via the anti-thermal deformation member.

The anti-thermal deformation member may be coupled to the outlet of the exhaust manifold so that, when one end thereof is heated as the exhaust gas introduced through the runners flows towards one side and is discharged, another end of the anti-thermal deformation member may be deformed in a contracted manner.

According to the present invention, when the exhaust manifold thermally expands due to hot exhaust gas, the apparatus compensates for the thermal expansion, thereby preventing breakage or deformation of other parts connected to the exhaust manifold.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
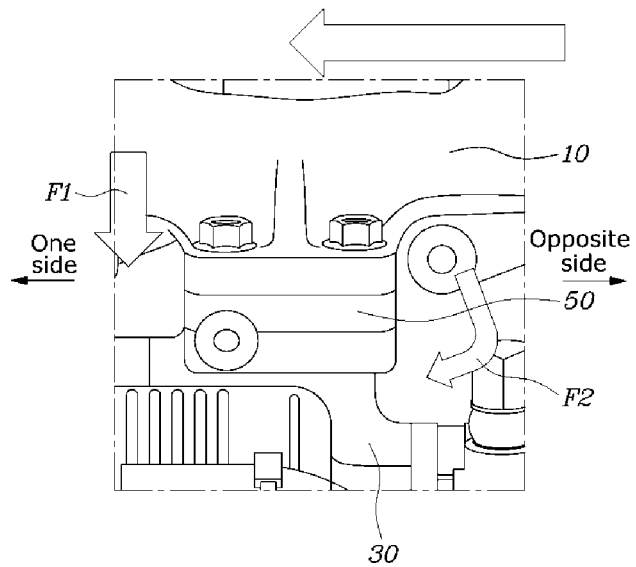
FIG. 2 is a view showing an exemplary apparatus to compensate for thermal expansion occurring from an exhaust manifold in an engine according to the present invention.
Figure 3:
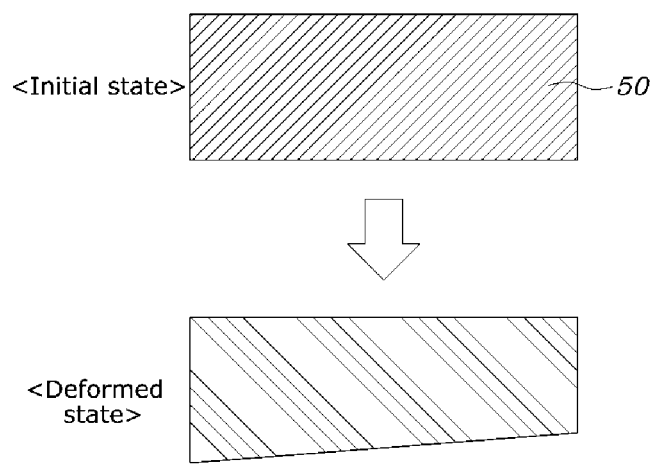
FIG. 3 is a view showing an anti-thermal deformation member of the exemplary apparatus shown in FIG. 2.

FIG. 2 is a view showing an apparatus to compensate for thermal expansion occurring from an exhaust manifold in an engine according to various embodiments of the present invention, and FIG. 3 is a view showing an anti-thermal deformation member of the apparatus shown in FIG. 2.

The apparatus of the invention is intended to, when the exhaust manifold thermally expands due to hot exhaust gas generated during driving of an engine, prevent the damage or deformation of other parts connected to the exhaust manifold.

To this end, the apparatus is provided with an anti-thermal deformation member 50 that is provided between the exhaust manifold 10 and a turbo charger 30 so as to connect them together while being deformed when the exhaust manifold 10 thermally expands due to hot exhaust gas, compensating for thermal deformation caused by the thermal expansion.

The exhaust manifold 10 is provided with a plurality of runners into which exhaust gas is introduced from a combustion chamber of an engine, and an outlet to which the runners are connected. The exhaust manifold 10 thermally expands because hot exhaust gas continuously pass through the exhaust manifold during driving of the engine.

The turbo charger 30 is connected to the exhaust manifold 10 so that it is fed with the exhaust gas from the outlet and compresses intake air. However, when the exhaust manifold 10 suffers from thermal expansion due to intense heat generated during driving of an engine, the turbo charger 30 may also be subjected to thermal deformation due to the thermal expansion of the exhaust manifold, thereby being deformed. Here, the turbo charger 30 is bolt-coupled to the engine side via a bracket. In this case, when the exhaust manifold 30 thermally expands, the turbo charger is subjected to the deformation force occurring from the thermal expansion, resulting in the fastening bolts being unfastened or damaged. Further, in addition to the turbo charger 30, other parts connected to the turbo charger may also be damaged.

Therefore, the present invention provides the anti-thermal deformation member 50 that is provided between the exhaust manifold 10 and a turbo charger 30 so as to connect them together while being deformed when the exhaust manifold 10 or the turbo charger 30 thermally expands due to hot exhaust gas, compensating for thermal deformation caused by the thermal expansion and therefore reducing the deformation force transferred to the turbo charger 30.

That is, the anti-thermal deformation member 50 may be provided to a contact between the exhaust manifold 10 and the turbo charger 30. The anti-thermal deformation member is deformed in response to the thermal expansion of the exhaust manifold 10 so that thermal deformation is distributed in opposite direction to the portion to which the thermal deformation is applied, compensating for the applied deformation force.

The anti-thermal deformation member 50 may be deformed in a contracted manner at an opposite end to an end compressed due to the thermal expansion of the exhaust manifold 10 when being fed with an intense source of heat from the exhaust manifold 10.

The anti-thermal deformation member 50 may be formed of a shape-memory alloy at a specified end thereof whose shape is memorized within a certain temperature range.

That is, the anti-thermal deformation member 50 is formed of shape-memory alloy by which it expands or contracts due to intense heat so that the shape changes. When fed with intense heat, the anti-thermal deformation member 50 takes a memorized shape within a certain temperature range. Preferably, deformed states due to thermal expansions of both the exhaust manifold 10 and the turbo charger 30 may be all memorized.

When the anti-thermal deformation member 50 is fed with the intense heat as the exhaust manifold 10 thermally expands, the anti-thermal deformation member is deformed into a pre-memorized shape so that the deformation force of the exhaust manifold is distributed and compensated for. Here, when the temperature of the exhaust manifold 10 decreases, temperature to be transferred to the anti-thermal deformation member 50 also decreases, so that the anti-thermal deformation member is deformed into the initial deformation shape, leading to the exhaust manifold 10 and the turbo charger 30 being in a supported state before their thermally-expanded state.

Particularly, when the anti-thermal deformation member 50 is fed with intense heat from the exhaust manifold 10, the anti-thermal deformation member may be deformed in a contracted manner at an opposite end to an end compressed due to the thermal expansion of the exhaust manifold 10.

As show in FIG. 2, when deformation force acts towards the turbo charger 30 as the exhaust manifold 10 thermally expands, the deformation force is exerted to the anti-thermal deformation member 50 between the exhaust manifold 10 and the turbo charger 30 and the anti-thermal deformation member 50 contracts at the side opposite the side receiving the deformation force, compensating for the deformation force.

When the thermal deformation force occurring from the thermal expansion of the exhaust manifold 10 acts onto the left side of the anti-thermal deformation member 50, as shown in FIG. 3, the right side of the anti-thermal deformation member 50 is deformed in a contracted manner, resulting in the deformation force transferred from the exhaust manifold 10 towards the turbo charger 30 being distributed and compensated for.

Figure 1:
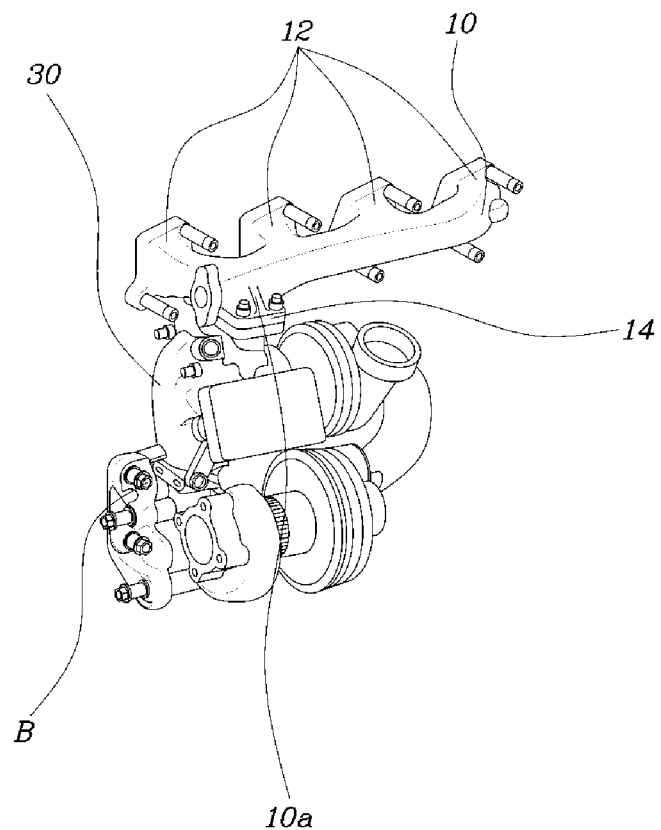
FIG. 1 is a view showing a conventional exhaust manifold.

Specifically, as shown in FIG. 1, the exhaust manifold 10 has a plurality of runners 12 into which exhaust gas is introduced from a combustion chamber of an engine, and an outlet 14 through which introduced exhaust gas is discharged towards the turbo charger 30, wherein the outlet 14 extends downwards from a longitudinal end 10a and is connected to the turbo charger 30 via the anti-thermal deformation member 50.

Here, the anti-thermal deformation member 50 may be coupled to the outlet 14 of the exhaust manifold 10 so that, when one end thereof is heated as the exhaust gas introduced through the runners 12 flows towards one side and is discharged, the other end thereof is deformed in a contracted manner.

In the structure of the exhaust manifold 10, the exhaust gases introduced through runners 12 from the combustion chamber are combined, flow towards one side, and are discharged through the outlet 14. Accordingly, as shown in FIG. 2, the exhaust gas introduced through runners 12 acts towards one side of the outlet 14 of the exhaust manifold 10 with a greater pressure, allowing that side of the outlet 14 to thermally expand further more.

That is, since the thermal deformation force F1 due to the thermal expansion of the exhaust manifold 10 is applied to one side of the anti-thermal deformation member 50, the anti-thermal deformation member 50 is deformed due to the intense heat transferred from the exhaust manifold 10. Here, the anti-thermal deformation member 50 is deformed in a contracted manner at the opposite side to the side receiving the thermal deformation force F1, providing the compensating force F2 towards the other side of the outlet 14.

Thereby, the deformation force occurring from the thermal expansion of the exhaust manifold 10 is compensated for, minimizing the breakage of the turbo charger 30 and other parts connected thereto due to the thermal expansion of the exhaust manifold 10.

According to the present invention, the contact between the exhaust manifold 10 and the turbo charger 30 is formed with the anti-thermal deformation member 50 made of a shape-memory alloy, so that thermal expansion of the exhaust manifold 10 can be compensated for without the restriction of a layout. Further, since the shape memory alloy can be fabricated such that it is deformed within a predetermined temperature range, efficient compensation of the deformation force can be obtained by calculating the deformation force depending on the thermal expansion of the exhaust manifold 10 or the turbo charger 30.

Therefore, when the exhaust manifold 10 thermally expands due to hot exhaust gas, the apparatus compensates for the thermal expansion, thereby preventing breakage or deformation of other parts connected to the exhaust manifold 10.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for compensating for thermal expansion occurring from an exhaust manifold in an engine, the apparatus comprising:
   an anti-thermal deformation member provided between the exhaust manifold and a turbo charger and connecting the exhaust manifold and the turbo charger together, wherein the anti-thermal deformation member is configured to be deformed when the exhaust manifold thermally expands due to hot exhaust gas and compensates for thermal deformation caused by the thermal expansion of the exhaust manifold,
   wherein the exhaust manifold includes:
      a plurality of runners into which the exhaust gas is introduced from a combustion chamber of the engine; and
      an outlet through which the introduced exhaust gas is discharged towards the turbo charger,
   wherein the outlet extends downwards from a longitudinal end of the exhaust manifold and is connected to the turbo charger via the anti-thermal deformation member, and
   wherein the anti-thermal deformation member is configured to be deformed in a contracted manner and a second end of the anti-thermal deformation member is compressed relatively more than a first end of the anti-thermal deformation member, due to the thermal expansion of the exhaust manifold when the anti-thermal deformation member is fed with a heat source from the exhaust manifold,
   wherein the anti-thermal deformation member is formed of a shape-memory alloy and a shape of the shape-memory alloy is memorized within a predetermined temperature range.

* * * * *